Nov. 12, 1957 H. WARNER 2,812,975
CONVERTIBLE HARD TOP FOR AUTOMOBILES
Filed June 16, 1954 4 Sheets-Sheet 2

INVENTOR.
Heinrich Warner.
Eric E. Crombie

Nov. 12, 1957 H. WARNER 2,812,975
CONVERTIBLE HARD TOP FOR AUTOMOBILES
Filed June 16, 1954 4 Sheets-Sheet 3
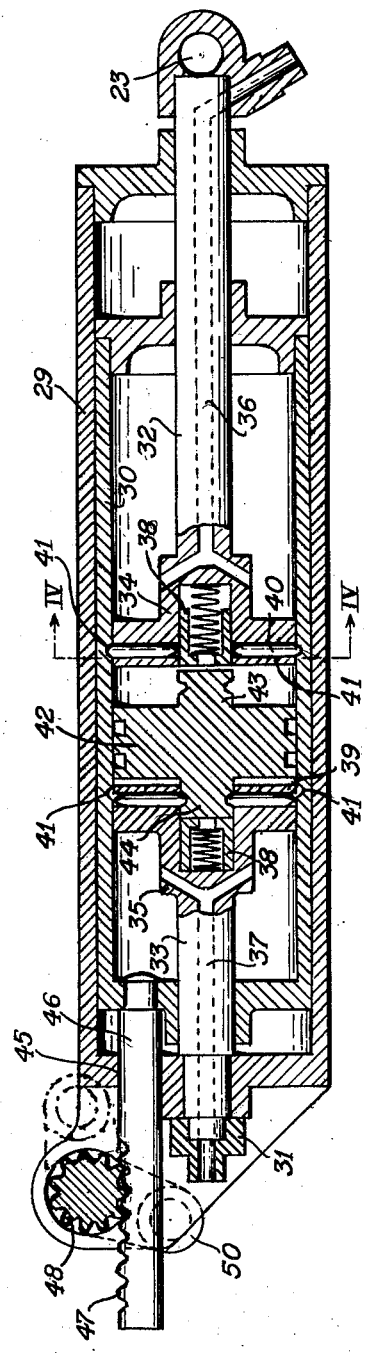
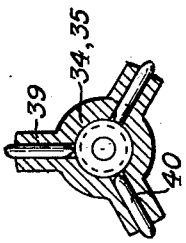
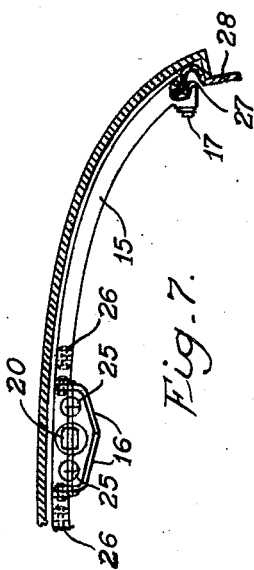
INVENTOR.
Heinrich Warner.
Eric E. Jromber

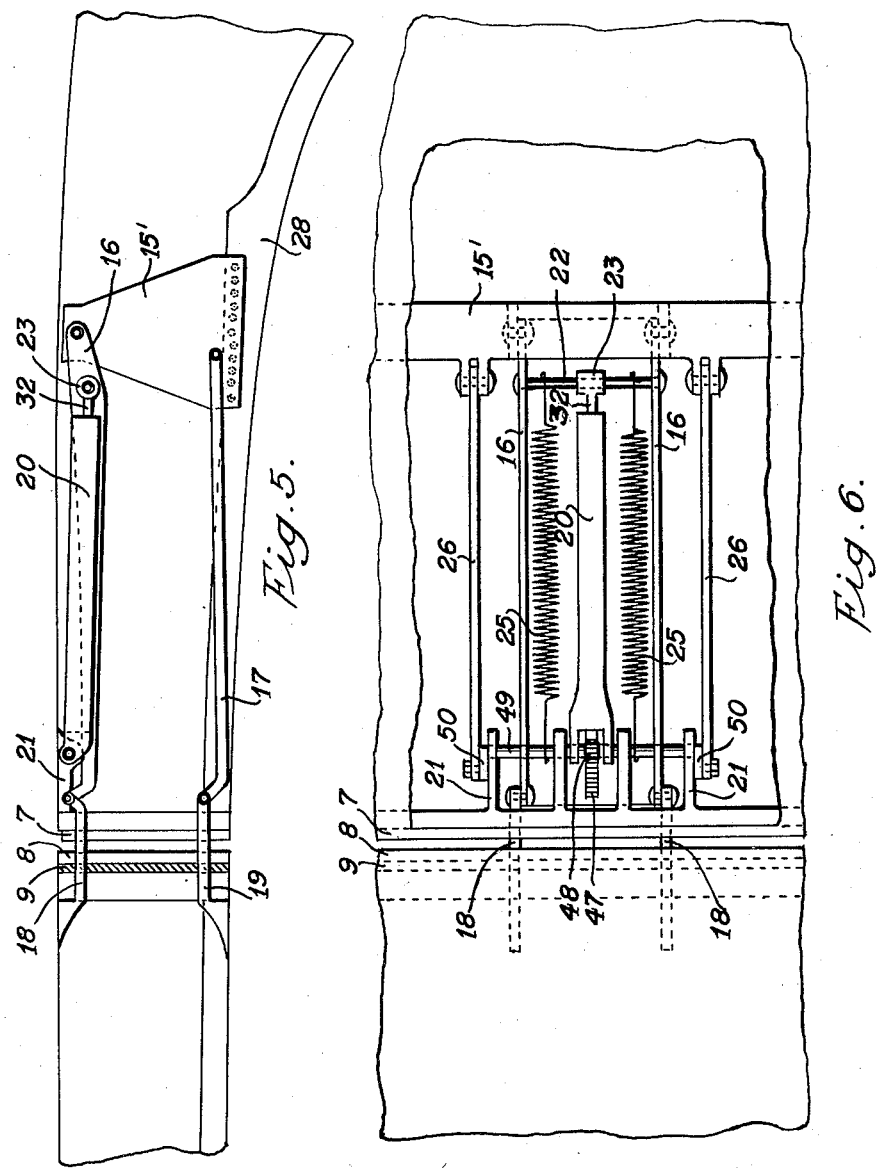

United States Patent Office 2,812,975
Patented Nov. 12, 1957

2,812,975

CONVERTIBLE HARD TOP FOR AUTOMOBILES

Heinrich Warner, Flushing, N. Y.

Application June 16, 1954, Serial No. 437,156

9 Claims. (Cl. 296—117)

The present invention relates to a convertible hard top for automobiles.

Various designs for convertible hard automobile body tops have been proposed in the past. According to some designs, the convertible hard top consists of several parts joined to each other by means of stays or hinges, or the parts are mounted on guide rails, or supported by telescopic guide members. As far as I am aware, none of these prior designs has been commercially utilized.

The object of this invention is to provide an improved convertible hard top for automobiles which can be operated from the instrument board of the automobile to either cover the automobile body, or to open and fold into a storage space provided within the automobile body.

According to the invention, the convertible hard top consists of several sections, preferably three sections, which are multiple-joined to each other, namely by means of central and lateral connecting links, to assure accurate movements of the individual sections and to prevent rattling because of momentary unilateral stresses when the automobile is driven over, say, an uneven road. The links connecting the individual sections are mounted on trusses which are slidingly fastened to the respective sections of the top. The invention provides for hydraulic operation of the convertible hard top. As part of the operation of extending the top over the automobile body, suitably designed hydraulic lifts cause the trusses to undergo a reverse movement which, in conjunction with the links and with suitably adapted locking levers, produces an intimate and rigid juncture between the individual elements without continuous application of hydraulic pressure. The assembled body top is exceptionally firm and free of noise. It is made leak-proof by means of compressible rubber sealing strips at the junctures.

The center links are preferably given the shape of a box-like structure in order to enclose the hydraulic cylinders and spring pairs adjacent to the hydraulic cylinders. These spring pairs are adjusted in strength to the weight of the respective sections. Upon opening, the entire convertible top is pivoted in such a manner that the rear section swings behind the back seat of the automobile and the other sections are stacked in front of the rear section, behind the back seat. Because of the intrinsic shape of the top and the construction of the connecting elements for the individual sections, the space required for stacking the sections is small, since the sections are nested within each other. Thus, practically the entire back space of the automobile is available for the customary luggage compartment. The individual sections of the convertible hard top can be covered inside with fabric and/or sound-proofing material, to exclude the trusses and lateral links from view.

The novel features which I consider characteristic of my invention are set forth with particularity in the appended claims. The invention itself, however, and any additional objects and advantages thereof will best be understood from the following description of a preferred embodiment when read in conjunction with the accompanying drawings, in which:

Fig. 3 is a sectional view of one of the auxiliary hydraulic lifts;

Fig. 4 is a partial sectional view on the line IV—IV in Fig. 3;

Fig. 5 is a partial view of two sections of the convertible hard top, illustrating the positioning of the trusses and the arrangement of links together with one of the auxiliarly hydraulic lifts;

Figure 1:
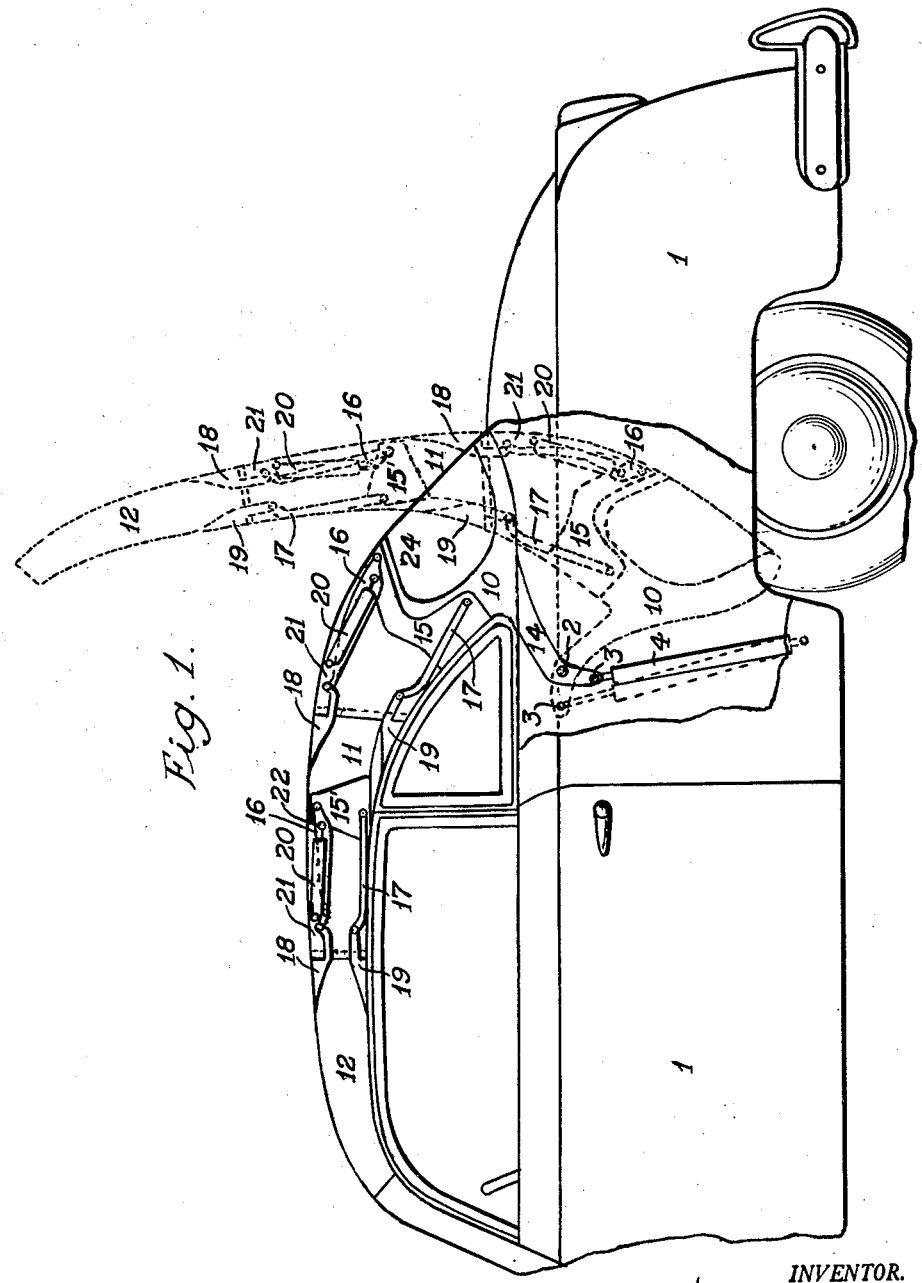
Fig. 1 is an elevation, partly sectional, of a passenger automobile provided with the convertible hard top of this invention; said convertible hard top being shown in a closed position and in the first phase of opening.

Fig. 6 is a top view of two adjacent sections of the convertible hard top, illustrating the mounting of the box-shaped center links, one of the auxiliary hydraulic lifts, and the connecting rods and locking links provided in conjunction with the auxiliary hydraulic lifts; and Fig. 7 is a sectional view of part of the convertible hard top, illustrating the positioning of the trusses, the lateral links and the box-shaped center links, as well as of one of the auxiliary hydraulic lifts and the adjacent springs and connecting rods.

Referring in more detail to the drawings, there is illustrated an automobile body 1 provided with a convertible hard top consisting of the three sections 10, 11 and 12. These sections may be cut from one stamped metal sheet of proper shape, but suitably greater length to allow for the bending of undercut edges, such as the reinforced edge 7 fitting the likewise reinforced edge 8 of an adjacent section, the latter being provided, moreover, with a resilient sealing strip 9.

Figure 2:
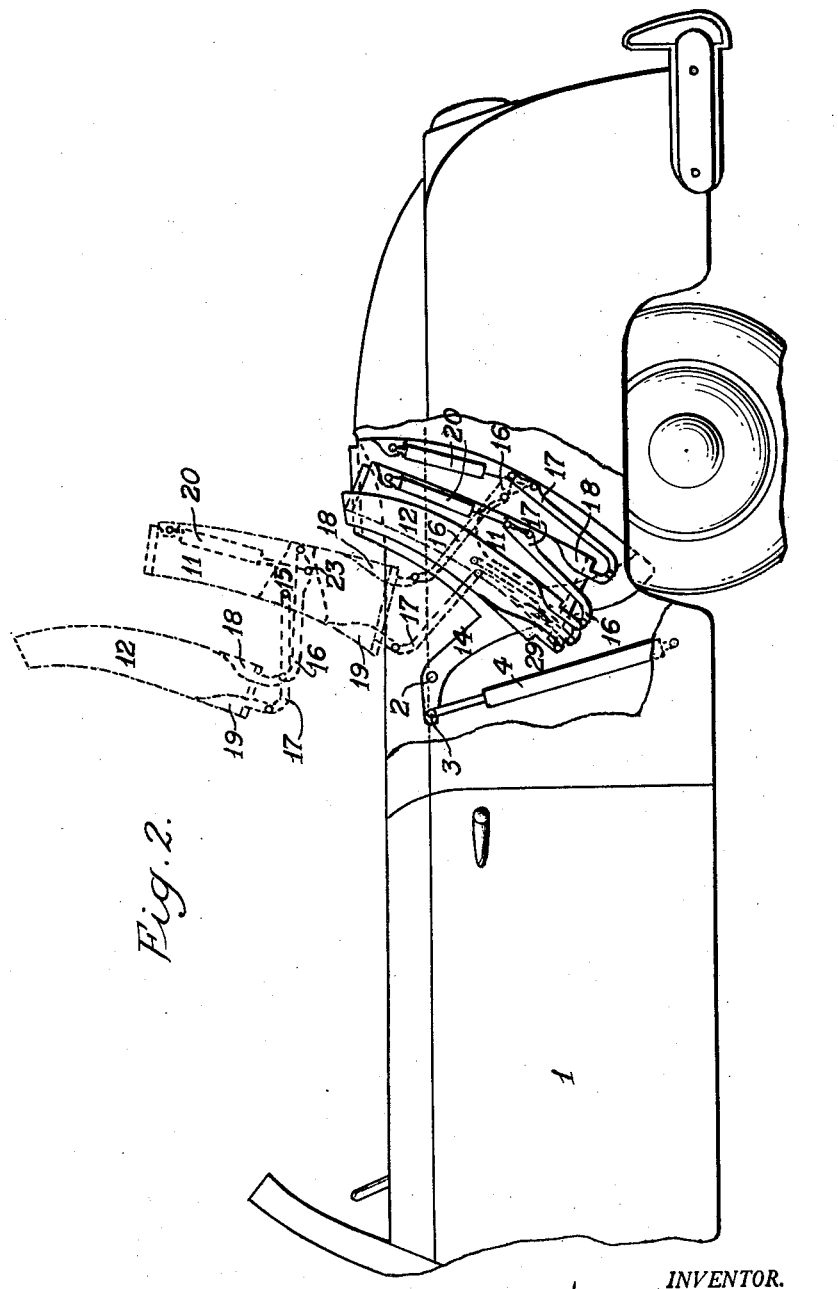
Fig. 2 is an elevation, partly sectional, illustrating the mode of stacking the sections of the convertible hard top within the automobile body and indicating the second phase of opening.

The rear section 10 of the convertible hard top is provided with arms 14, extending from the lowermost edge of the rear section as shown in Figs. 1 and 2. At the pivots 2, these arms are rotatably fastened to the automobile body. A downward extension of these arms is journalled at 3 to the free ends of piston shafts extending from substantially vertically mounted, reciprocally acting main hydraulic lifts 4, the lower ends of which are journalled to the automobile body so as to permit a limited rotational movement of these hydraulic lifts about the journal as the center.

The rear section 10 as well as the center section 11 of the convertible hard top are provided with transversal trusses 15 and 15', respectively, adapted to slide back and forth over a limited distance. The purpose of these movable trusses is to fasten thereto the center links 16 and the lateral link pairs 17 in such a manner that they can be pivoted vertically about the point of fastening. The center section 11 and the front section 12 are provided each with one pair of centrally fixed bracket arms 18 and one pair of laterally fixed bracket arms 19 which, as shown, extend backwards beyond the rear edges of the said sections.

The centrally mounted bracket arms 18 are rotatably connected with the center links 16 and each of the laterally mounted bracket arms 19 is rotatably connected with one of the lateral links 17. These parts, namely the links 16 and 17 on the one hand and the bracket arms 18 and 19 on the other hand are shaped in such a manner so as to permit the links 16 and 17 to go through a rotational movement over an arc of about 180° with respect to the section of the convertible hard top to which they are fastened by means of the trusses 15 or 15' and to assume, after the convertible hard top has been raised and the sections 11 and 12 have been tilted forward, a position which is again substantially parallel to the respective section, but opposite to the original position. (See Fig. 2.)

The two center assemblies, each comprising the box-shaped center links 16 fastened to the truss member 15' and the bracket arms 18, are provided with auxiliary hydraulic lifts 20, each held at one end by means of a hanger bearing 21 welded to the middle of the arch of the respective top section, and at the other end by means of a bolt 22 riveted to the box-shaped center links 16, which passes through an eyelet 23 of the piston shaft 32 extending from the cylindrical housing of the hydraulic lift 20. At the same time, the bolts 22 serve as one of the end supports for the springs 25 at either side of the auxiliary hydraulic lifts. The opposite ends of these springs are fastened to the shaft of the aforementioned hanger bearings 21.

As shown particularly in Fig. 7, the trusses 15 and 15' have substantially the same curvature as that part of the respective section of the convertible hard top underneath of which they are mounted. At their bases, the trusses are provided with guide channels, such as the guide channel 27, adapted to receive roller-supported, flanged edges 28 of the respective top section, to permit a linear back and forth movement of the trusses over a limited distance.

The two main hydraulic lifts 4 and the two auxiliary hydraulic lifts 20 are operated by means of an electrically operated pump the action of which is initiated and governed by electric means including starter buttons at the instrument board of the automobile, electrically operated valves for the supply of hydraulic fluid, first to the main hydraulic lifts and then to the auxiliary hydraulic lifts, and contact operated circuit interrupters. Such auxiliary devices and their mode of operation are well known and they are not further mentioned in the subsequent description.

Upon actuating the main hydraulic lifts 4, the entire convertible hard top is pivoted about the fulcrum 2 and raised into a substantially vertical position as indicated in Fig. 1. Upon reaching this position, the pistons of the main hydraulic lifts 4 have reached their lowermost point within the piston cylinders and the lifts cease to act. Immediately thereupon, the auxiliary hydraulic lifts 20 commence to operate, in such a manner that sections 10, 11 and 12 are first disengaged from each other; immediately thereafter, the sections 11 and 12 are lowered and stowed within the space provided behind the back seat of the automobile, whereby section 11 is positioned in front of section 10 and section 12 in front of section 11.

Fig. 3 illustrates in detail the construction and operation of the auxiliary lifts 20. Fitted concentrically into the housing cylinder 29 is a second cylinder 30. The two cylinders are closed at both ends except for concentric borings adapted to accommodate a movable hydraulic shaft 32 fastened at one end to the valve head 34, and a stationary hydraulic stem 33 fastened with one end to a similar valve head 35. By means of a fitting 31, the stationary hydraulic stem is fixed in position with respect to the outside cylinder 29, which, however, does not prevent the inside cylinder 30 from moving back and forth along the hydraulic stem. The hydraulic shaft and the hydraulic stem are provided with borings 36 and 37, respectively, to serve as conduits for hydraulic fluid from and to the previously mentioned pump. Within the valve heads 34 and 35, these conduits branch into two outlets as shown, to cause the passage of hydraulic fluid to and from the space within the cylinder 30. Moreover, the valve heads are provided with spring-biased locking sleeves 38 and the front ends of the valve heads expand into multi-cornered, say, two- or three-cornered radial members 39, each provided with a concentric boring loaded with a round-headed pin such as the pin 40 which, if pushed outward by the respective locking sleeve 38, extends slightly beyond the peripheral edge of the radial member to fit with the other round-headed end into borings 41 drilled at appropriate points into the inside wall of the cylinder 30.

Arranged within the cylinder 30 between the two valve heads is the piston 42 which is provided at both sides with co-axial, grooved bosses 43 and 44. These bosses are grooved to let the pins 40 slip into the grooves whenever one of the bosses acts against the respective locking sleeve in pushing it back inside the valve head by overcoming the pressure of the spring. This arrangement within the auxiliary hydraulic lifts of a piston having grooved bosses in conjunction with spring-biased locking sleeves, the afore-described pins and a movable inside cylinder permits the execution of movements which are necessary in separating and stacking the sections of the convertible hard top during the process of opening, and in raising and reuniting these sections during the process of closing.

Fastened eccentrically but axis-parallel to the head of the inside cylinder 30 and passing, as shown, through a boring 45 in the adjacent head of the outside cylinder 29, is a bar 46 into the top edge of which the teeth of a rack 47 are cut. Geared to this rack is a pinion 48 which is part of a shaft 49 with a clamp lever 50 at each end.

After the convertible hard top has been raised into a substantially vertical position by means of the main hydraulic lifts 4 during the first phase of opening, the second phase is initiated by hydraulic fluid entering under pressure the cylinder 30 of both hydraulic lifts 20 through the conduit 37. While reference is had, in the subsequent description, to only one of the auxiliary hydraulic lifts 20, it is to be understood that the two hydraulic lifts 20 are of the same construction and that they operate at the same time and substantially in the same manner. By means of the pins 40 of the valve head 35, the piston 42 is locked in engagement with the said valve head at this moment of the operation. As a result, the hydraulic pressure moves the cylinder 30 and, consequently, the rack 47 in an upward direction (i. e. toward the left in Fig. 3). This movement actuates the pinion 48, the shaft 49 and the clamp levers 50 into forcing either the sections 10 and 11 or the sections 11 and 12 of the convertible hard top apart from each other, depending upon to which of the two auxiliary hydraulic lifts 20 the present description is applied.

As soon as the terminal point of this movement of the cylinder 30 is reached, the upper borings 41 (at the left in Fig. 3) of the cylinder 30 are exactly in juxtaposition with the pins 40 of the valve head 35 and the hydraulic fluid, exerting pressure from the groove of the boss against the pins resting in the groove, forces them into the borings 41 with their other ends. This enables the piston 42 to detach itself from the valve head 35. The spring-biased locking sleeve 38 of the valve head 35 is released and prevents a return movement of the pins 40. Thus, the inner cylinder 30 is now locked together with the valve head 35 and the hydraulic stem 33 and is fixed in position. Consequently, the piston 42 commences to move downward under the influence of the hydraulic pressure. Upon encountering the extended locking sleeve 38 of the valve head 34, the boss 43 of the piston forces the locking sleeve inside the valve head and the pins 40 of the valve head 34 which, until now, had locked this valve head and the hydraulic shaft 32 to the inner cylinder 30, are forced out of the lower borings 41 (at the right in Fig. 3) in cylinder 30 and into the groove of the piston boss 43. This locks the piston 42 to the valve head 34 and the hydraulic shaft 32. The continued downward movement of the piston causes the hydraulic shaft 32 to increasingly extend from the cylinder 29 and to produce the required pivotal rotation of the center links 16 and the lateral links 17 which results in lowering the convertible hard top sections 11 and 12, respectively, and in stacking them inside the automobile body.

The operations involved in raising the convertible hard top include a first phase, initiated by the entry of hydraulic fluid under pressure from the master pump into the boring 36 of the hydraulic shaft 32 of each of the two hydraulic lifts 20. In each case, the pressure causes an upward movement of the piston 42 and the hydraulic shaft 32, and the upward movement of the latter a pivotal rotation of the center levers 16 and the lateral levers 17 so that the sections 11 and 12 of the convertible hard top are raised and positioned substantially vertically above each other and above the section 10, but without being joined to each other, as yet. However, at this moment the lower borings 41 of the inner cylinders 30 of the two hydraulic cylinders 20 are in juxtaposition with the pins 40 of the valve heads 34. Because of the pressure of hydraulic fluid entering into the cylinder 30 through the conduit 36, the piston 42 is pushed upward and the boss 43 of the piston which had been pressing against the spring-biased locking sleeve 38 of the valve head 34 releases this locking sleeve which, upon slipping forward, moves the pins 40 into locking position with the boring 41 of the cylinder 30 where they are held by the released locking sleeve. Thus, the hydraulic shaft 32 and the inside cylinder 30 are locked to each other. Under the influence of hydraulic pressure, the pins 40 of the valve head 35 are pushed out of the borings 41 simultaneously with the hydraulic shaft 32 commencing a return movement which, in actuating the clamping lever 50 and the connecting rod 26 on either side of the piston cylinders 20, causes a downward movement of the trusses 15. Upon disengagement from the hydraulic shaft 32, the piston 42 presses by means of the boss 43 against the spring-biased locking sleeve 35 of the fixed hydraulic stem 33. The moment the piston 42 reaches its terminal position, the groove of the boss 43 is exactly in juxtaposition with the pins 40 of the valve head 35 and the hydraulic fluid pressure causes the pins to drop into the groove. Because of the simultaneous return movement of the inner cylinder 30, the pins are forced to remain in this position and the inner cylinder is free to move independently of the piston. This stage in the operation of the auxiliary hydraulic lifts is depicted in Fig. 3. Being fastened to the end of the inner cylinder, the bar 46 with the rack 47 is forced to follow the return movement of the inner cylinder and, in turning the pinion 48 and the clamping levers 50, forces the trusses 15 and 15' to move backward. Upon passing, in their movements, through a linear alignment, the clamping levers 50 and the bolt 22 cause the respective sections of the convertible hard top to be strongly pressed together and to be united into one rigid piece. At this point, the pressure within the hydraulic lifts 20 is released and the main hydraulic lifts 4 commence lowering the united convertible hard top into horizontal position. As soon as the front end of the convertible hard top rests against the rim of the windshield of the automobile, the two are connected with each other in any usual manner, for example by means of bolts and wing nuts.

Having described my invention, I claim:

1. A convertible hard top for automobiles which, in combination with an automobile body, extends rigidly over the automobile body in a first position and is stowed within the automobile body in a second position, said convertible hard top comprising a plurality of sections including a front section and a rear section, two arms reaching in said first position forward and extensions of said arms reaching downwardly from the base of the rear section, pivots fastening said arms to said automobile body, trusses of substantially the cross-sectional shape of the respective sections positioned underneath each section in back of the front section and slidingly connected to said sections to reciprocally move over a short distance parallel to said sections, one pair of center links and one pair of lateral links pivotally attached at one end of each to each of said trusses, one pair of center bracket arms and one pair of lateral bracket arms attached to and reaching back from each section in front of the rear section, and means rotatably connecting said center links with said center bracket arms and said lateral links with said lateral bracket arms at their other ends to cause a rigid engagement between adjacent sections upon attaining said first position in conjunction with a backward movement of said trusses and a disengagement between adjacent sections in conjunction with a forward movement of said trusses, followed by a lowering and stacking of the sections in front of the rear section upon attaining said second position after a substantially 180° rotation of said center links and lateral links.

2. A convertible hard top according to claim 1, including substantially vertically mounted, reciprocally acting expandible means the lower ends of which are journalled to said automobile body so as to permit rotation of said expandible means substantially parallel to said automobile body, and the upper ends of which are rotatably connected with said downward extensions of said arms, to rotate said arms over substantially 90° about said pivots upon placing the convertible hard top in said second position.

3. A convertible hard top according to claim 2, wherein said substantially vertically mounted, reciprocally acting expandible means are hydraulic lifts.

4. A convertible hard top according to claim 1, including expandible means acting upon said trusses to cause said rigid engagement between adjacent sections upon attaining said first position and said disengagement between adjacent sections followed by a lowering and stacking of the sections in front of the rear section upon attaining said second position.

5. A convertible hard top according to claim 4, wherein said expandible means acting upon said trusses are hydraulic lifts.

6. A convertible hard top according to claim 1, wherein the pairs of said center links are connected to each other by transverse bolts inserted near the trusses to which said center links are fastened, hanger bearing extend downward from said sections behind the first section, shafts are mounted between said hanger bearings, springs pairs, adapted to substantially compensate for the weight of the respective sections, are arranged between each of said center link pairs and fastened between said shafts and said transverse bolts, reciprocally acting, auxiliary hydraulic lifts are arranged between said spring pairs and fastened between said shafts and said transverse bolts, said reciprocally acting, auxiliary hydraulic lifts being adapted to transmit movements causing a raising and linear arrangement of the sections of the convertible hard top and a rigid engagement between adjacent sections upon attaining said first position and to transmit inverse movements causing a disengagement between adjacent sections and a lowering and stacking of the sections in front of the rear section upon attaining said second position, and connecting means imparting said movements to the respective sections.

7. A convertible hard top according to claim 6, wherein each of said reciprocally acting, auxiliary hydraulic lifts comprises a housing cylinder, an internal cylinder fitted to slide back and forth within said housing cylinder, a movable hydraulic shaft extending from one side into said internal cylinder and fastened with its outside end to one of said transverse bolts, a stationary hydraulic stem extending from the other side into said internal cylinder and held fixedly in position by said housing cylinder, concentric borings provided within said hydraulic shaft and hydraulic stem to serve as conduits for hydraulic fluid to and from said internal cylinder, valve heads mounted at the free ends of said hydraulic shaft and hydraulic stem, spring-biased locking sleeves fitted so as to extend concentrically from said valve heads, a plurality of radial members fitted to said valve heads and provided with borings loaded with locking pins, depressions drilled into the inside wall of said internal cylinder to fit the outside ends of said locking pins at appropriate operating positions of said internal cylinder, a piston with bosses on either side fitted between said two valve heads, grooves cut into said bosses to fit the inside ends of said locking pins at appropriate operating positions of said piston, a bar passing through the head of said housing cylinder fastened eccentric and axial-parallel to the head of said internal cylinder, a rack cut into the outside top edge of said bar, a pinion, geared to said rack and mounted on the hanger shaft holding the respective auxiliary hydraulic lift, clamping links fastened to the ends of said hanger shaft, and connecting rods linking said clamping links with the respective transversal truss.

8. A convertible hard top according to claim 6, wherein said center links the shaped to form a box-like structure, enclosing said auxiliary hydraulic lift and said springs.

9. A convertible hard top according to claim 1, in which at least one of two adjacent edges of the sections of said convertible hard top is reinforced and provided with an undercut, and a resilient sealing strip is inserted between said adjacent edges.

References Cited in the file of this patent

UNITED STATES PATENTS

| | | |
|---|---|---|
| 2,007,873 | Paulin | July 9, 1935 |
| 2,596,355 | Ackermans | May 13, 1952 |
| 2,623,779 | Catell | Dec. 30, 1952 |
| 2,632,670 | Crenshaw | Mar. 24, 1953 |

FOREIGN PATENTS

| | | |
|---|---|---|
| 874,860 | Germany | Apr. 27, 1953 |